United States Patent
Nakahara

(10) Patent No.: US 8,194,271 B2
(45) Date of Patent: Jun. 5, 2012

(54) APPARATUS AND METHOD FOR GRADATION DRAWING BASED ON 1-LINE IMAGE

(75) Inventor: Hideo Nakahara, Osaka (JP)

(73) Assignee: KYOCERA MITA Corporation, Osaka (JP)

( * ) Notice: Subject to any disclaimer, the term of this patent is extended or adjusted under 35 U.S.C. 154(b) by 1066 days.

(21) Appl. No.: 12/115,141

(22) Filed: May 5, 2008

(65) Prior Publication Data

US 2008/0278752 A1 Nov. 13, 2008

(30) Foreign Application Priority Data

May 9, 2007 (JP) ................. 2007-124348

(51) Int. Cl.
*G06F 15/00* (2006.01)
(52) U.S. Cl. .................. 358/1.15; 358/1.16
(58) Field of Classification Search .......... 358/1.1, 358/1.9, 1.15, 1.16, 448, 521
See application file for complete search history.

(56) References Cited

U.S. PATENT DOCUMENTS

2002/0093671 A1   7/2002   Ohno

FOREIGN PATENT DOCUMENTS

| JP | 2001-101431 |   | 4/2001 |
|----|-------------|---|--------|
| JP | 2002-063582 |   | 2/2002 |
| JP | 2005-038084 | A | 2/2005 |
| JP | 2007-026285 | A | 2/2007 |

OTHER PUBLICATIONS

Patent Abstracts of Japan, Publication No. 2002-063582, Publication Date Feb. 28, 2002.

*Primary Examiner* — Thomas D Lee
(74) *Attorney, Agent, or Firm* — Connolly Bove Lodge & Hutz LLP

(57) ABSTRACT

An image processing apparatus which generates intermediate codes by dividing a drawing image into prescribed bands extending in one direction, develops the intermediate codes into a bit image is provided with an expanded image judging unit which judges whether an image to be drawn is an expanded image of a 1-line source image; an image expansion direction judging unit which judges whether an expansion direction of the expanded image is parallel with the band extending direction when the expanded image judging unit judges that the image is the expanded image of the 1-line source image; a drawing data processing unit which converts the expanded image of the 1-line source image into vectors which are a series of rectangular regions of same-color pixels that are arranged continuously when the image expansion direction judging unit judges that the expansion direction of the expanded image is parallel with the band extending direction.

13 Claims, 11 Drawing Sheets

SOURCE IMAGE

DESTINATION IMAGE

DESTINATION IMAGE GENERATED
THROUGH CONVERSION INTO VECTORS

SOURCE IMAGE

DESTINATION IMAGE

DESTINATION IMAGE GENERATED
THROUGH CONVERSION INTO VECTORS

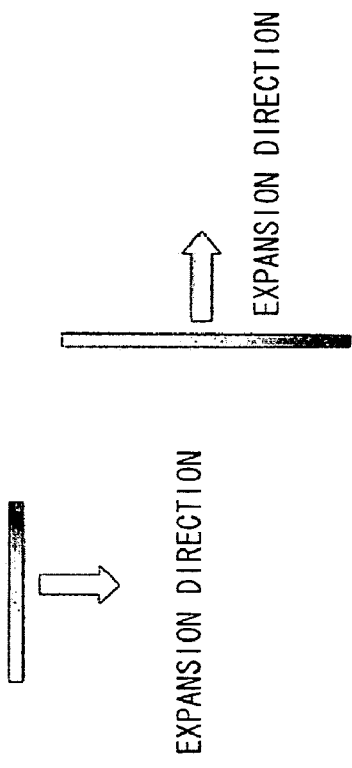
FIG. 10A
FIG. 10B
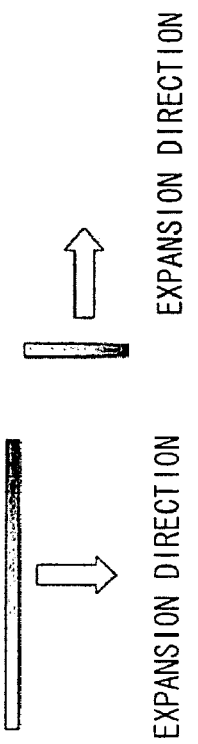
FIG. 10C
FIG. 10D
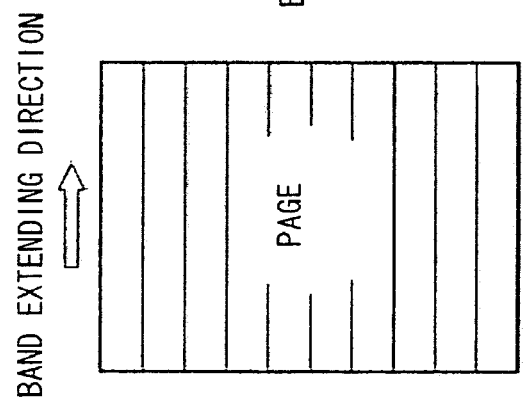
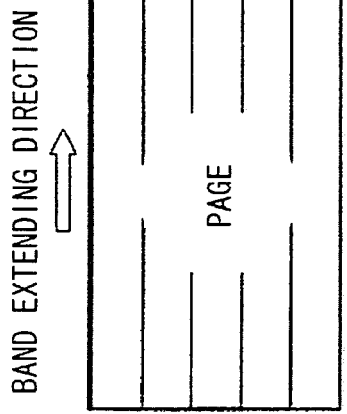

APPARATUS AND METHOD FOR GRADATION DRAWING BASED ON 1-LINE IMAGE

BACKGROUND OF THE INVENTION

1. Field of the Invention

The present invention relates to an image processing apparatus such as a print processing apparatus which processes a request for printing data of a text, an image, a path figure, or the like as well as to a related image processing program.

2. Description of the Related Art

In image-forming apparatus having a printing function such as printers, copiers, facsimile machines, and MFP (Multi-Function Peripheral) having the functions of these apparatus, a configuration for saving the memory area is known in which a print job of each page is converted into intermediate codes after being divided into plural bands, the intermediate codes are stored in memory areas, and image printing is performed on a page-by-page basis by rasterizing the stored intermediate codes into a bit image.

As for drawing of a gradation fill figure, a technique is proposed in which 1-line pixel information is copied to the pixels of the next line when gradation is detected. In this technique, Gradation is drawn by generating a gradient pattern by calculating pixel colors and copying it.

In such an image processing apparatus, in drawing processing of a gradient object, what number of gradation layers an image processing object has in the horizontal direction or the vertical direction is detected. Only the first gradation layer detected is calculated and the first layer is copied to the second and following layers. In this manner, the time taken to generate an object having a number of gradation layers which have a fixed pattern in the vertical direction or the horizontal direction is shortened. High-speed image processing is thus enabled.

Incidentally, consideration will be given to a case of generating a destination image DI1 shown in FIG. 7B which is H pixels in height and W pixels in width and is an expanded version of a source image (subject drawing object) SI1 shown in FIG. 7A which is 1 (H') pixel in height and W' pixels in width or a destination image DI2 shown in FIG. 8B which is H pixels in height and W pixels in width and is an expanded version of a source image SI2 (subject drawing object) shown in FIG. 8A which is H' pixels in height and 1 (W') pixel in width. In conventional image processing, when as shown in FIG. 9 source image data in a source image buffer is drawn on a destination buffer after subjecting it to computation, to generate a destination image through scan conversion it is necessary to refer to a source image pixel corresponding to each pixel of the destination image. However, in drawing an image by expanding 1-line source image data perpendicularly to the line direction, the same pixel of the source image is referred to many times in scan conversion, which is inefficient.

Where each page is divided into plural bands and drawing processing is performed on a band-by-band basis rather than on each page collectively, a 1-band memory area is used in drawing each band. In general memories, the processing speed may be high when data is written at continuous addresses and low when data is written at uncontinuous addresses. In setting memory areas for storage of bands, to enable high-speed processing, the band extending direction is made to coincide with the high-speed processible direction of the memory. Therefore, the processing speed is high when processing is performed in the band extending direction and is low when processing is performed in the direction perpendicular to it.

FIGS. 10A-10D show examples of expansion of a 1-line image. FIGS. 10A and 10B show a case that bands are generated so as to extend in the shorter direction of a page and FIGS. 10C and 10D show a case that bands are generated so as to extend in the longer direction of a page. FIGS. 11A and 11B show how images shown in FIGS. 10A and 10B are expanded so as to be replaced by rectangles. Images shown in FIGS. 10C and 10D are expanded in similar manners.

FIG. 11A shows a case that the image is expanded perpendicularly to the band extending direction, and FIG. 11B shows a case that the image is expanded in the band extending direction. Expanded images are shown in the second left parts of FIGS. 11A and 11B. Band-by-band expanded images are shown in the second right parts of FIGS. 11A and 11B. Since drawing processing is performed on a band-by-band basis, results of replacement of each same-color region with a rectangle are shown in the rightmost parts of FIGS. 11A and 11B (only one of plural replacement rectangles is shown). Where the longer sidelines of each rectangle are parallel with the band extending direction as in the case of FIG. 11B, processing perpendicular to the band extending direction occurs less frequently and hence the processing speed is high. In contrast, where the image is expanded perpendicularly to the band extending direction as in the case of FIG. 11A, the image is replaced by a large number of rectangles when the color of the image varies to a large extent. When the replaced rectangles are drawn, the processing speed is low because processing perpendicular to the band extending direction occurs frequently.

As described above, in gradation drawing processing based on a 1-line image, when an image with gradation having a high degree of color variation is expanded perpendicularly to the band extending direction, the image is expanded so as to be replaced by a large number of rectangles and hence the processing speed is low. Furthermore, since these rectangles are frequently processed in the direction perpendicular to the band extending direction, the memory access efficiency is low, which is also a factor of processing speed reduction by the replacement.

SUMMARY OF THE INVENTION

The present invention has been made in view of the above problems in the art, and embodiments of the invention perform gradation drawing processing based on a 1-line image at high speed.

According to one exemplary embodiment of the invention, an image processing apparatus comprising: a communication unit configured to communicate with an external apparatus; an expanded image judging unit configured to judge whether an image to be drawn in response to a request that is received from the external apparatus by the communication unit is an expanded image of a 1-line source image; an image expansion direction judging unit configured to judge whether an expansion direction of the expanded image of the 1-line source image is parallel with a band extending direction when the expanded image judging unit judges that the image to be drawn is the expanded image of the 1-line source image; a drawing data processing unit configured to analyze the 1-line source image and convert the expanded image of the 1-line source image into vectors that are a series of rectangular regions of same-color pixels that are arranged continuously when the image expansion direction judging unit judges that the expansion direction of the expanded image of the 1-line source image is parallel with the band extending direction; and a drawing processing unit configured to generate a bit map of a destination image to be drawn on a basis of the expanded image as converted into the vectors by the drawing data processing unit, wherein intermediate codes are: generated by dividing a drawing image into prescribed bands extending in one direction, developed into a bit image, and drawn as the bit image.

Another exemplary embodiment of the invention, an image processing apparatus comprising: a communication unit configured to communicate with an external apparatus; an expanded image judging unit configured to judge whether an image to be drawn in response to a request that is received from the external apparatus by the communication unit is an expanded image of a 1-line source image; an image expansion direction judging unit configured to judge whether an expansion direction of the expanded image of the 1-line source image is parallel with a band extending direction when the expanded image judging unit judges that the image to be drawn is the expanded image of the 1-line source image; a color variation judging unit configured to judge whether the expanded image of the 1-line source image is a small color variation image on a basis of a comparison result between an analyzed value of the 1-line source image and a threshold value when the image expansion direction judging unit judges that the expansion direction of the expanded image is not parallel with the band extending direction; a drawing data processing unit configured to analyze the 1-line source image and convert the expanded image of the 1-line source image into vectors that are a series of rectangular regions of same-color pixels that are arranged continuously when the color variation judging unit judges that the expanded image of the 1-line source image is the small color variation image; and a drawing processing unit configured to generate a bit map of a destination image to be drawn on a basis of the expanded image as converted into the vectors by the drawing data processing unit, wherein intermediate codes are: generated by dividing a drawing image into prescribed bands extending in one direction, developed into a bit image, and drawn as the bit image.

Another exemplary embodiment of the invention is a processor-readable storage medium on which an image processing program is stored, the image processing program being executed by a computer provided in an image processing apparatus which generates intermediate codes by dividing a drawing image into prescribed bands extending in one direction in response to a request that is received from an external apparatus by a communication unit which communicates with the external apparatus, develops the intermediate codes into a bit image, and draws the bit image, the image processing program causing the computer to execute: the expanded image judging step of judging whether an image to be drawn in response to a request is an expanded image of a 1-line source image; an image expansion direction judging step of judging whether an expansion direction of the expanded image of the 1-line source image is parallel with the band extending direction when the expanded image Judging step judges that the image to be drawn is the expanded image of the 1-line source image; a drawing data processing step of analyzing the 1-line source image and converting the expanded image of the 1-line source image into vectors which are a series of rectangular regions of same-color pixels that are arranged continuously when the image expansion direction judging step judges that the expansion direction of the expanded image of the 1-line source image is parallel with the band extending direction; and a drawing processing step of generating a bit map of a destination image to be drawn on the basis of the expanded image as converted into the vectors by the drawing data processing step.

Another exemplary embodiment of the invention is a processor-readable storage medium on which an image processing program is stored, the image processing program being executed by a computer provided in an image processing apparatus which generates intermediate codes by dividing a drawing image into prescribed bands extending in one direction, develops the intermediate codes into a bit image, and draws the bit image, the image processing program causing the computer to execute: a communication step of communicating with an external apparatus; an expanded image judging step of Judging whether an image to be drawn in response to a request that is received from the external apparatus by the communication step is an expanded image of a 1-line source image; an image expansion direction judging step of judging whether an expansion direction of the expanded image of the 1-line source image is parallel with the band extending direction when the expanded image of the 1-line source image judging step judges that the image to be drawn is the expanded image of the 1-line source image; a color variation judging step of judging whether the expanded image of the 1-line source image is a small color variation image on the basis of comparison result between an analyzed value of the 1-line source image and a threshold value when the image expansion direction judging step judges that the expansion direction of the expanded image of the 1-line source image is not parallel with the band extending direction; a drawing data processing step of analyzing the 1-line source image and converting the expanded image of the 1-line source image into vectors which are a series of rectangular regions of same-color pixels that are arranged continuously when the color variation judging step judges that the expanded image of the 1-line source image is the small color variation image; and a drawing processing step of generating a bit map of a destination image to be drawn on the basis of the expanded image as converted into the vectors by the drawing data processing step.

Yet another exemplary embodiment of the invention is a method for image processing, comprising: receiving image drawing instruction; determining whether the image is an expanded image of a 1-line source image; when the image is an expanded image of a 1-line source image: determining whether the expansion direction is parallel with a band extending direction; determining whether the expanded image of the 1-line source image is a small color variation image on a basis of a comparison result between an analyzed value of the 1-line source image and a threshold value when the expansion direction is not parallel; analyzing the expanded image of a 1-line source image when the expansion direction; calculating rectangular regions of the expanded image; performing vector processing on each rectangular region; and when the image is not an expanded image of a 1-line source image, performing general-purpose image processing when the expanded image when the image is not an expanded image of a 1-line source image.

In yet another exemplary embodiment of the invention, a processor-readable storage medium containing a software program operable to cause a plurality of apparatus including a processor operating under the instructions of the software program to perform a method for image processing, comprising: receiving image drawing instruction; determining whether the image is an expanded image of a 1-line source image; when the image is an expanded image of a 1-line source image: determining whether the expansion direction is parallel with a band extending direction; determining whether the expanded image of the 1-line source image is a small color variation image on a basis of a comparison result between an analyzed value of the 1-line source image and a threshold value when the expansion direction is not parallel; analyzing the expanded image of a 1-line source image when the expansion direction; calculating rectangular regions of the expanded image; performing vector processing on each rectangular region; and when the image is not an expanded image of a 1-line source image, performing general-purpose image processing when the expanded image when the image is not a 1-line expansion image.

The above and other objects, features, embodiments and advantages of the invention will become more apparent from the following detailed description taken in connection with the accompanying drawings.

BRIEF DESCRIPTION OF THE DRAWINGS

FIGS. 10A-10D schematically show examples of expansion of a 1-line source image.

DESCRIPTION OF THE PREFERRED EMBODIMENT

An embodiment of the present invention will be hereinafter described in detail with reference to the drawings. The invention is not limited to the following embodiment, and it goes without saying that modifications can be made arbitrarily without departing from the spirit and scope of the invention.

Figure 1:
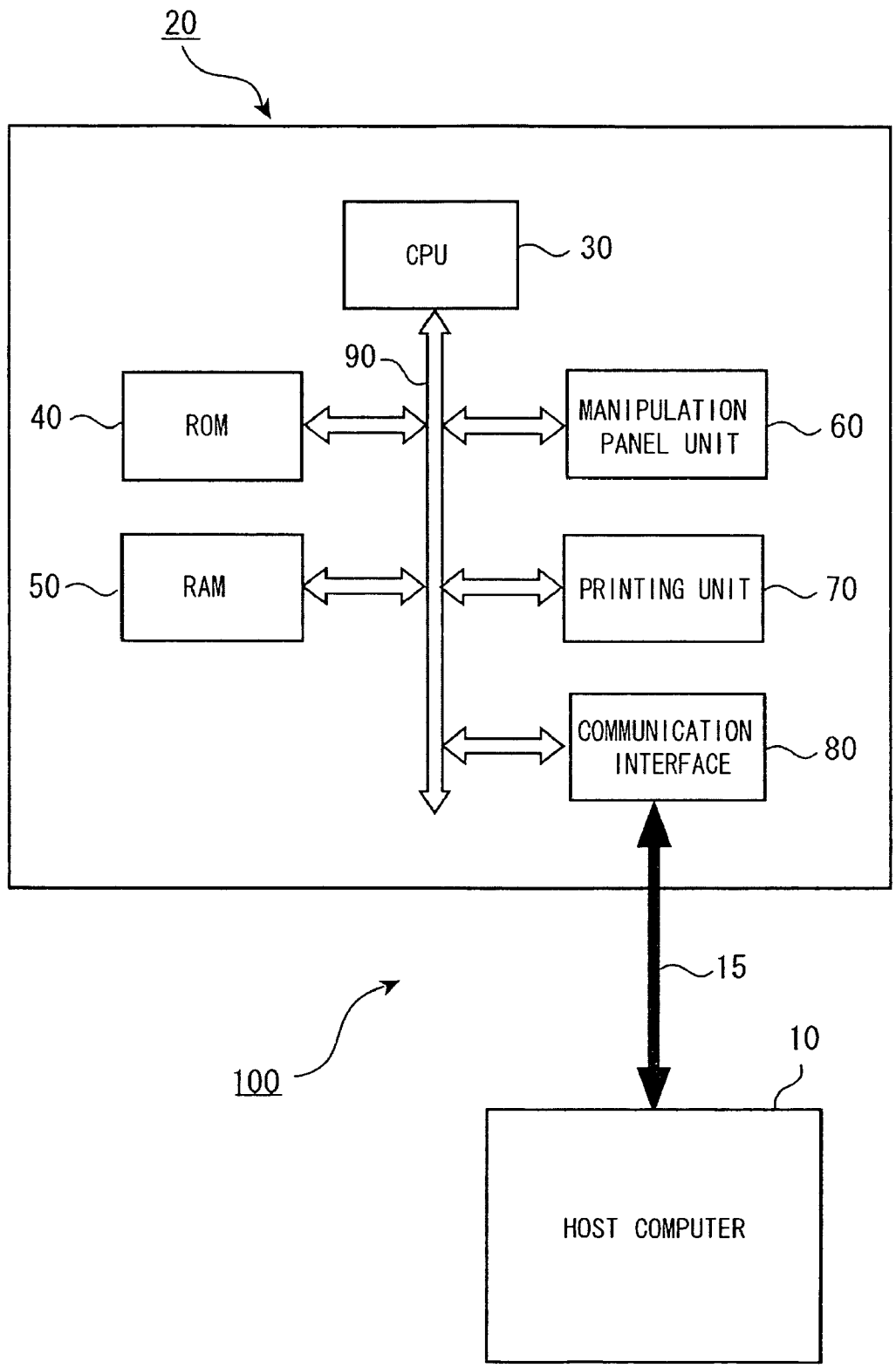
FIG. 1 is a block diagram of a printing system consisting of an image processing apparatus according to the embodiment of the present invention and a host computer.

For example, the embodiment of the invention is applied to an image processing apparatus 20 of a printing system 100 in which as shown in FIG. 1 a host computer 10 and the image processing apparatus 20 are connected to each other so as to be able to communicate with each other over a network 15 such as a LAN.

In the printing system 100, the image processing apparatus 20 is a printer having a function of printing print data which is supplied from the host computer 10. In the image processing apparatus 20, a computer (CPU) 30 which is configured to control the entire apparatus and performs various kinds of computation, a read-only memory (ROM) 40 which is configured to store programs and data, a random access memory (RAM) 50 which is configured to serve as a work area and stores programs and data temporarily, a manipulation panel unit 60 which is configured to be used for displaying various kinds of information and inputting various instructions, a printing unit 70 which is configured to print various kinds of data on recording media such as sheets using a known image forming process such as an electrophotographic process, a communication interface 80 such as a LAN card for connection to the network 15, and other units are connected to each other via a bus 90.

Figure 2:
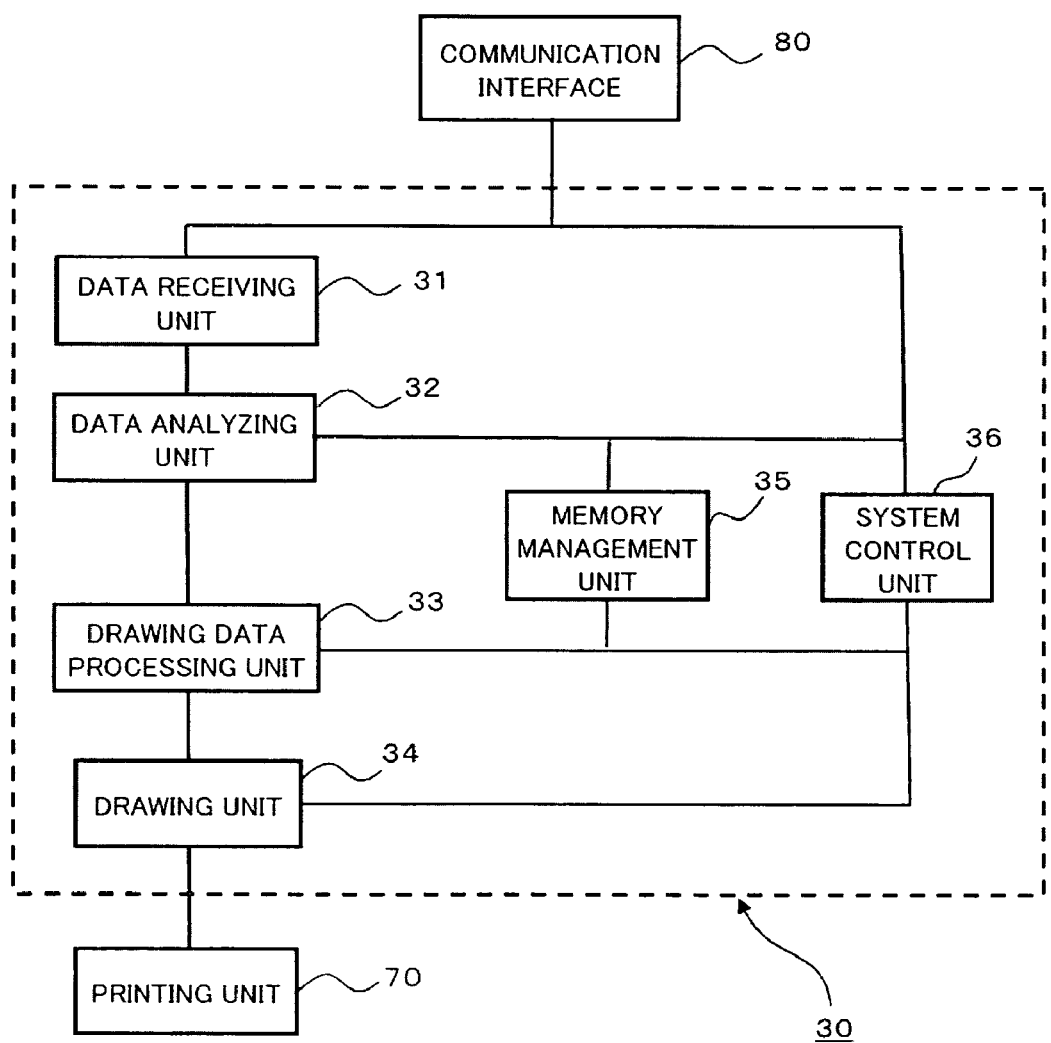
FIG. 2 is a block diagram showing a functional configuration of the image processing apparatus shown in FIG. 1.

FIG. 2 is a block diagram showing a configuration of the image processing apparatus 20. The image processing apparatus 20 incorporates, as processing functions of the CPU 30, a data receiving unit 31 which is configured to receive data via the communication interface 80, a data analyzing unit 32 which is configured to analyze the data received by the data receiving unit 31, a drawing data processing unit 33 which is configured to process drawing data according an instruction from the data analyzing unit 32, a drawing unit 34 which is configured to generate a bit map on a video RAM on the basis of a display list generated by the drawing data processing unit 33, a memory management unit 35 which is configured to manage the memories of the system, a system control unit 36 which is configured to manage information common to the system and controls the system, and other units. The printing unit 70 actually performs printing on a recording medium according to the bit map generated by the drawing unit 34.

Figure 3:
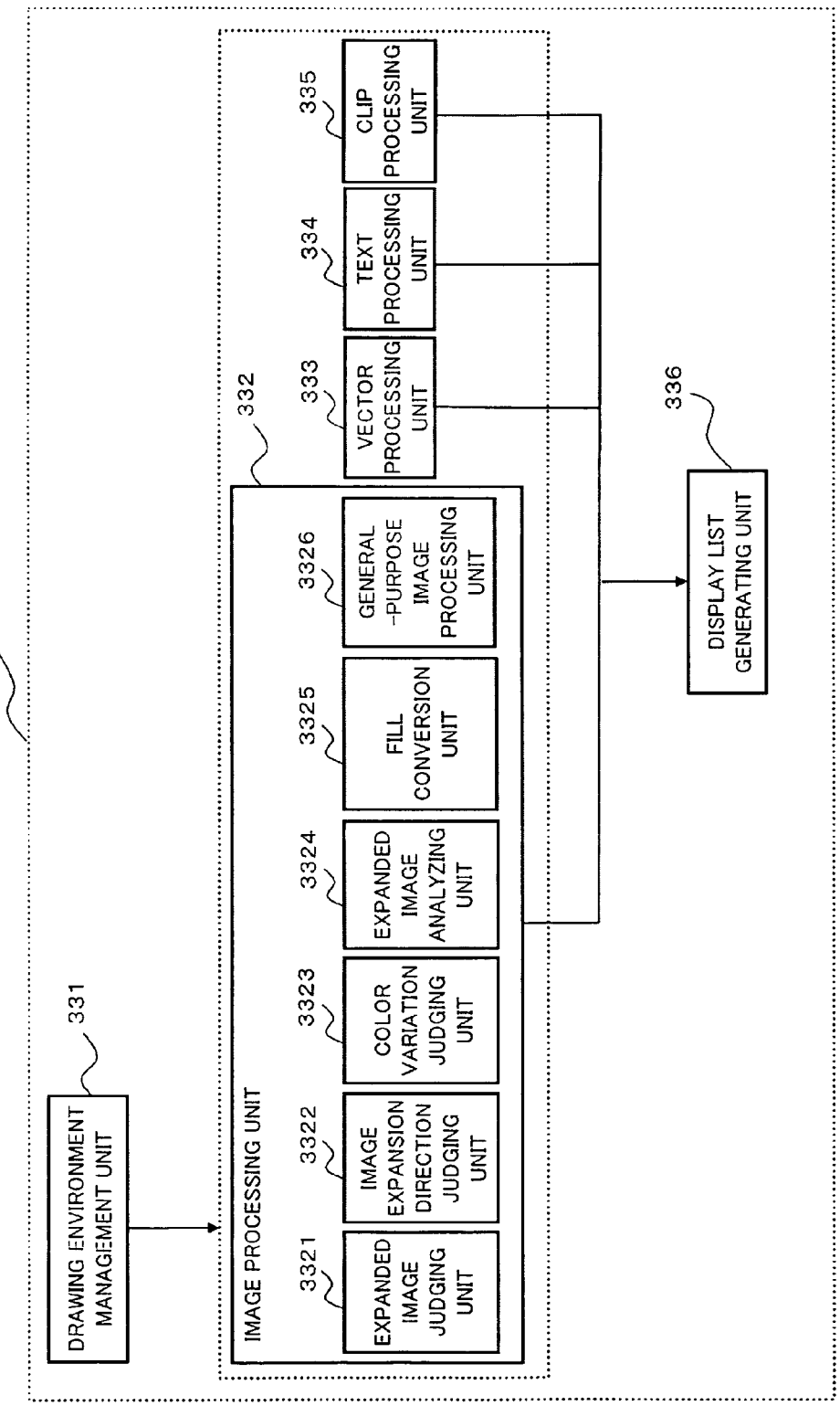
FIG. 3 is a block diagram showing a functional configuration of a drawing data processing unit of the image processing apparatus shown in FIG. 1.

FIG. 3 shows the configuration of the drawing data processing unit 33. The drawing data processing unit 33 is provided with a drawing environment management unit 331 which is configured to manage an expansion/reduction setting matrix and drawing-related setting information such as a currently effective screen, an image processing unit 332 which is configured to process image data, a vector processing unit 333 which is configured to process vector data, a text processing unit 334 which is configured to process text data, a clip processing unit 335 which is configured to perform clip processing, a display list generating unit 336 which is configured to generate a display list on the basis of pieces of information generated by the processing of the processing units 332-335, and other units. The image processing unit 332 is provided with an expanded image judging unit 3321 which is configured to judge whether an image to be drawn is an expanded image of a 1-line source image, an image expansion direction judging unit 3322 which is configured to judge whether the expansion direction of the expanded image of the 1-line source image is parallel with a band extending direction, a color variation judging unit 3323 which is configured to judge whether the expanded image of the 1-line source image is a small color variation image, an expanded image analyzing unit 3324 which is configured to analyze the 1-line source image to determine the numbers of same-color pixels that are arranged continuously, a fill conversion unit 3325 which is configured to process the expanded image of the 1-line source image as rectangular vector fill processing, and a general-purpose image processing unit 3326 which is configured to process an image that is not an expanded image of a 1-line source image as ordinary image processing.

The CPU 30 which is provided in the image processing 20 of the printing system 100 performs image processing according to image processing programs that are read from the ROM 40, for example.

Figure 4:
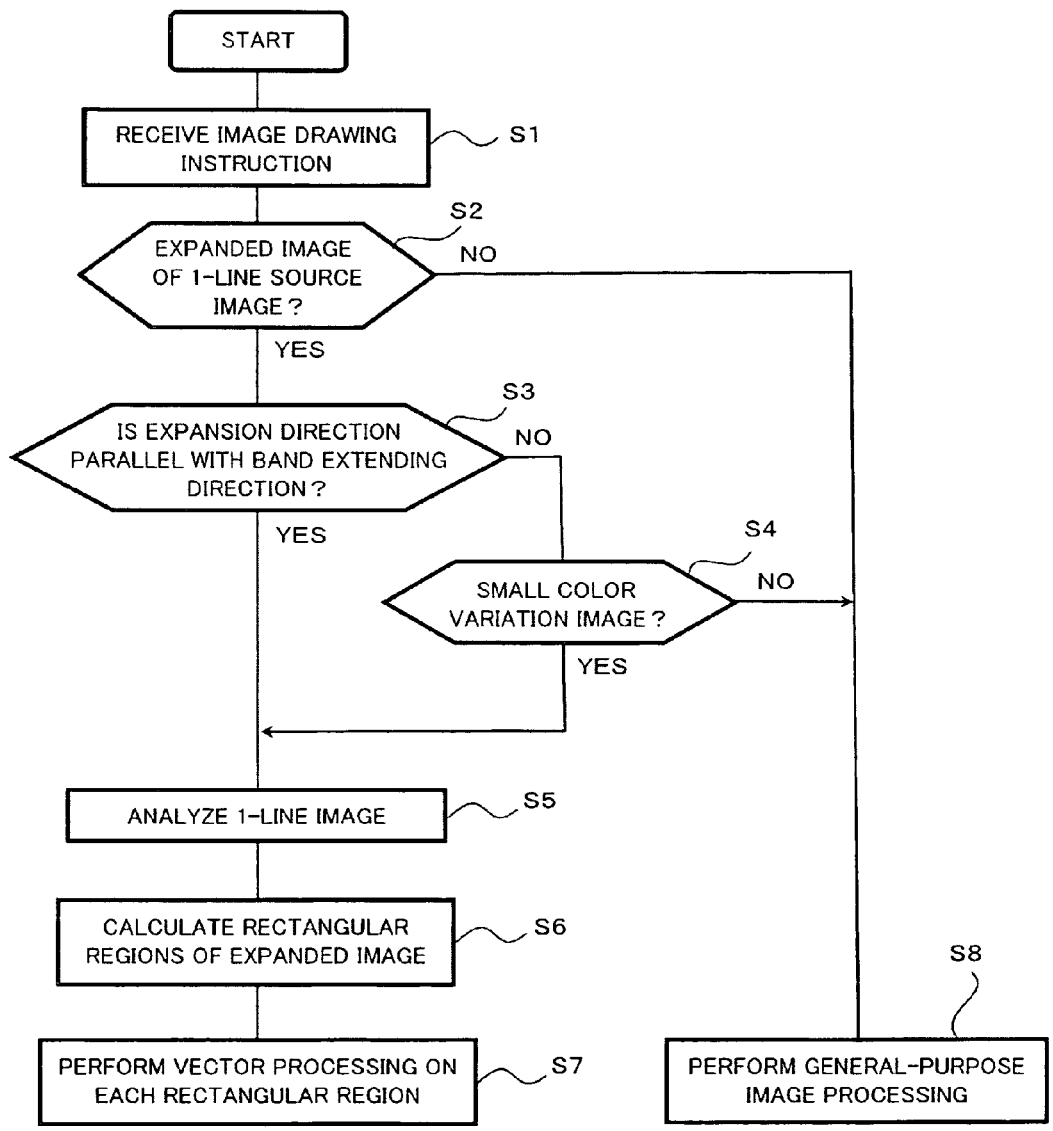
FIG. 4 is a flowchart showing the procedure of image processing of the image processing apparatus shown in FIG. 1.

That is, in the printing system 100, image processing is performed according to a flowchart shown in FIG. 4.

When print data is sent from the host computer 10 of the printing system 100, in the image processing apparatus 20 the data analyzing unit 32 analyzes the data that is received by the data receiving unit 31 via the communication interface 80. The data analyzing unit 32 analyzes the contents of the data and calls a suitable process of the drawing data processing unit 33. It is assumed here that an image drawing instruction has been received (step S1).

When an image drawing instruction is received, the data analyzing unit 32 calls the image processing unit 332 of the drawing data processing unit 33. Furthermore, to judge whether the image is an expanded image of a 1-line source image, the data analyzing unit 32 calls the expanded image judging unit 3321. The expanded image judging unit 3321 judges whether the designated image is an expanded image of a 1-line source image on the basis of a height and an expansion/reduction ratio of the image (step S2).

When the judgment result at step S2 is "yes," that is, when the image to be drawn is an expanded image of a 1-line source image, the image expansion direction judging unit 3322 judges whether the image expansion direction is parallel with a band extending direction (step S3). For example, when the image is such as shown in FIG. 10B or 10D, the image expansion direction judging unit 3322 judges that the image expansion direction is parallel with the band extending direction. When the image is such as shown in FIG. 10A or 10C, the image expansion direction judging unit 3322 judges that the image expansion direction is perpendicular to the band extending direction.

When the judgment result at step S2 is "no," that is, if the image to be drawn is not an expanded image of a 1-line source image, the general-purpose image processing unit 3326 performs conventional image processing (step S8).

When the judgment result at step S3 is "yes," that is, if the expansion direction of the expanded image of the 1-line source image is parallel with the band extending direction, the process moves to step S5, where the expanded image analyzing unit 3324 analyzes the image data. In this embodiment, the expanded image analyzing unit 3324 analyzes the 1-line source image data to determine the numbers of same-color pixels that are arranged continuously in the image data and records an analysis result (step S5).

When the judgment result at step S3 is "no," that is, if the expansion direction of the expanded image of the 1-line source image is not parallel with the band extending direction, the color variation judging unit 3323 judges whether the expanded image of the 1-line source image is the small color variation image on a basis of a comparison result between an analyzed value of the 1-line source image and a threshold value (step S4). At step S4, the color variation judging unit 3323 determines an average of the numbers of same-color pixels as the analyzed value that are arranged continuously in the 1-line source image and makes a threshold judgment. That is, the color variation judging unit 3323 judges that the expanded image of the 1-line source image is the small color variation image when the average is larger than the threshold value. When the average is not larger than the threshold value, the color variation judging unit 3323 judges that the expanded image of the 1-line source image is not the small color variation image.

When the judgment result at step S4 is "yes," that is, when the expanded image of the 1-line source image is the small color variation image, the expanded image analyzing unit 3324 analyzes the image data. In this embodiment, the expanded image analyzing unit 3324 analyzes the 1-line source image data to determine the numbers of same-color pixels that are arranged continuously in the image data and records an analysis result (step S5).

As described above, in the image processing apparatus 20 of the printing system 100, the expanded image analyzing unit 3324 analyzes image data at step S5 when the judgment result of the image expansion direction judging unit 3322 shows that the expansion direction of the expanded image of the 1-line source image is parallel with the band expansion direction or when the judgment result of the color variation judging unit 3323 shows that the expanded image of a 1-line source image is the small color variation image. In this embodiment, the expanded image analyzing unit 3324 analyzes the 1-line source image data to determine the numbers of same-color pixels that are arranged continuously in the image data and records an analysis result.

Table 1 shows an example of a recorded result of an analysis of a 1-line source image performed by the expanded image analyzing unit 3324.

TABLE 1

|  | Color (R, G, B) | | | |
| --- | --- | --- | --- | --- |
|  | 100, 100, 100 | 110, 110, 110 | 120, 120, 120 | 130, 130, 130 |
| Number of same color pixels | 10 | 12 | 12 | 15 |

As described above in the table 1, the numbers of same-color pixels are arranged continuously in the 1-line source image data and recorded as shown in FIG. 10A or FIG. 10C. In this case, the average of the numbers of same-color pixels is "11.25" and when the threshold value is "10,", the color variation judging unit 3323 judges that the expanded image of the 1-line source image is the small color variation image.

Then, the fill conversion unit 3325 determines rectangular regions each of which is to be drawn as a result of expansion of same-color pixels of the 1-line source image, through calculations using the analysis result of step S5 and the image expansion ratio (step S6).

The rectangular regions determined at step S6 are set as passes. Then, colors are set for the respective regions and rectangle fill processing is performed. These pieces of processing are performed by the fill conversion unit 3325 by using the drawing environment management unit 331 and the vector processing unit 333 (step S7).

When the judgment result at step S4 is "no," that is, when the expanded image of the 1-line source image is not the small color variation image, the general-purpose image processing unit 3326 performs conventional image processing (step S8).

As described above, in the image processing apparatus 20 of the printing system 100, when an image drawing instruction is received (step S1), whether an image to be drawn is an expanded image of a 1-line source image is judged (step S2). When the judgment result at step S2 shows that the image to be drawn is an expanded image of a 1-line source image, whether the expansion direction of the expanded image of the 1-line source image is parallel with a band extending direction is judged (step S3). When the judgment result at step S3 shows that the expansion direction of the expanded image of the 1-line source image is not parallel with the band extending direction, whether the expanded image of the 1-line source image is the small color variation image is judged (step S4). When the judgment result at step S3 shows that the expansion direction of the expanded image of the 1-line source image is parallel with the band extending direction as in the case of FIG. 10B or FIG. 10D, or when the judgment result at step S4 shows that the expanded image of the 1-line source image is the small color variation image though the judgment result at step S4 shows that the expansion direction of the expanded image of the 1-line source image is perpendicular to the band extending direction as in the case of FIG. 10A or FIG. 10C, the 1-line source image is analyzed (step S5). An expanded image of the 1-line source image is converted into vectors which are a series of rectangular regions of same-color pixels (step S7).

When the judgment result at step S2 is "no" (i.e., the image to be drawn is not an expanded image of a 1-line source image), or when the judgment result at step S4 is "no" (i.e., the expansion direction is perpendicular to the band extending direction and the expanded image of the 1-line source image is not the small color variation image), the general-purpose image processing unit 3326 performs conventional image processing.

Figure 5A:
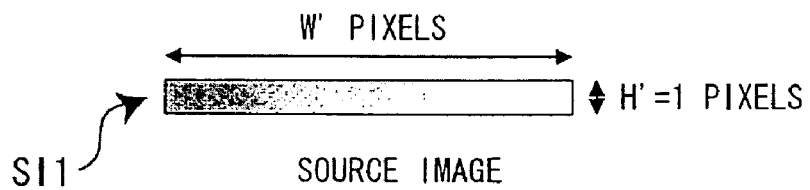
FIGS. 5A-5C schematically show an example in which an expanded image of a source image having a height of one pixel is drawn by the image processing apparatus shown in FIG. 1.
Figure 5B:
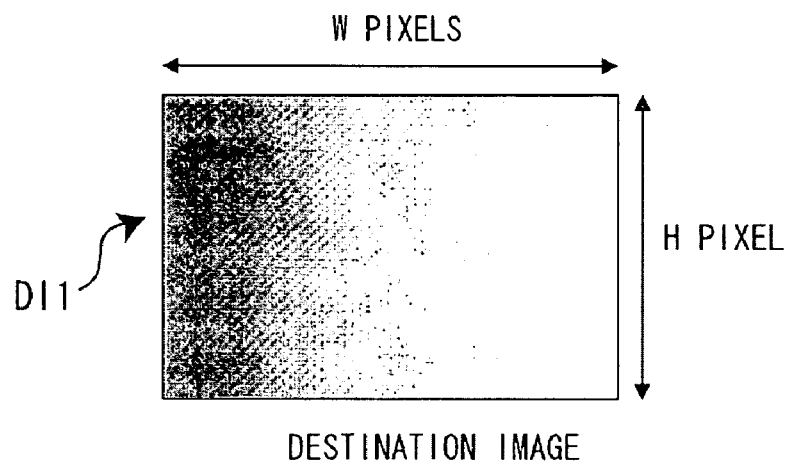
Figure 5C:
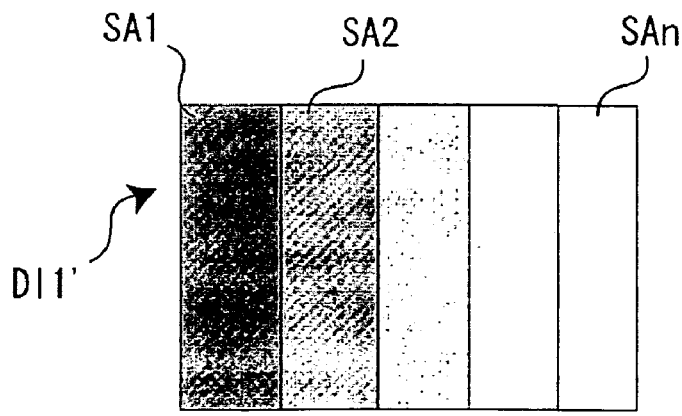
Figure 7A:
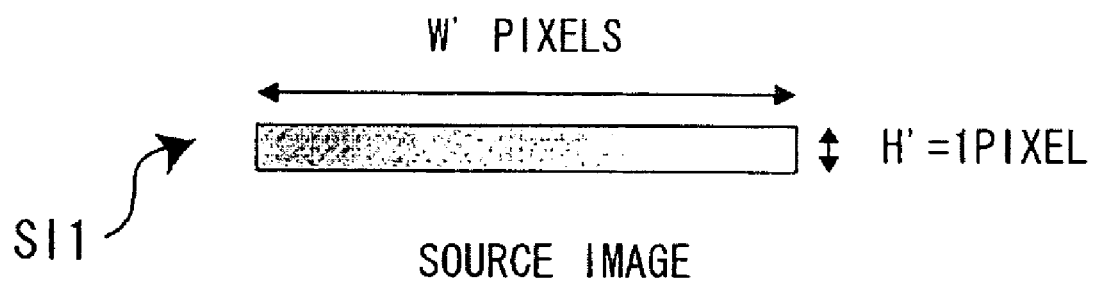
FIGS. 7A and 7B schematically show an example in which an expanded image of a source image having a height of one pixel is drawn by a conventional image processing apparatus.
Figure 7B:
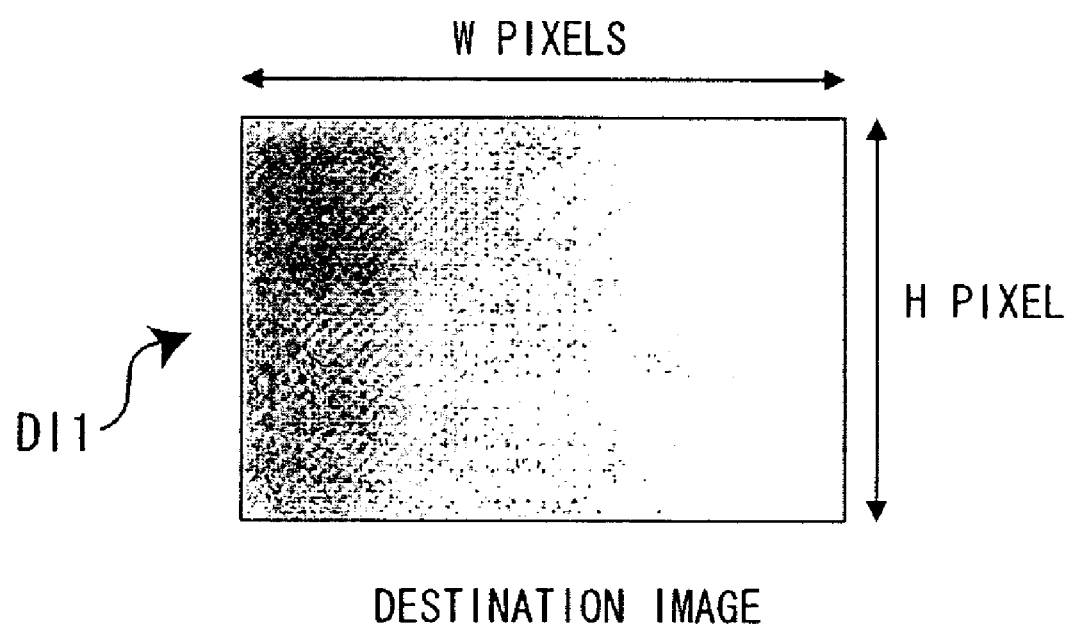
Figures 8A, 8B:
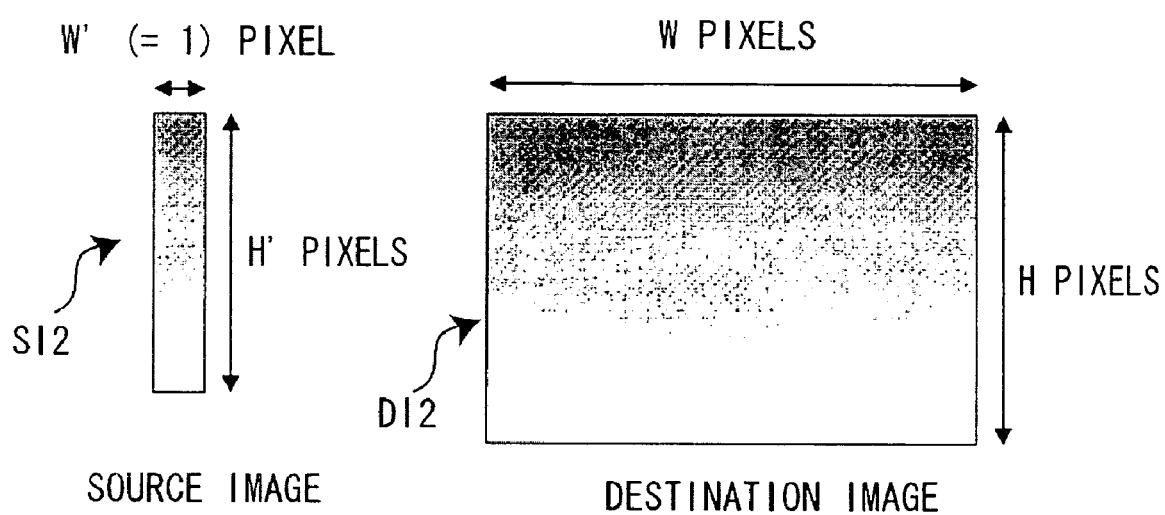
FIGS. 8A and 8B schematically show an example in which an expanded image of a source image having a width of one pixel is drawn by the conventional image processing apparatus.
Figure 9:
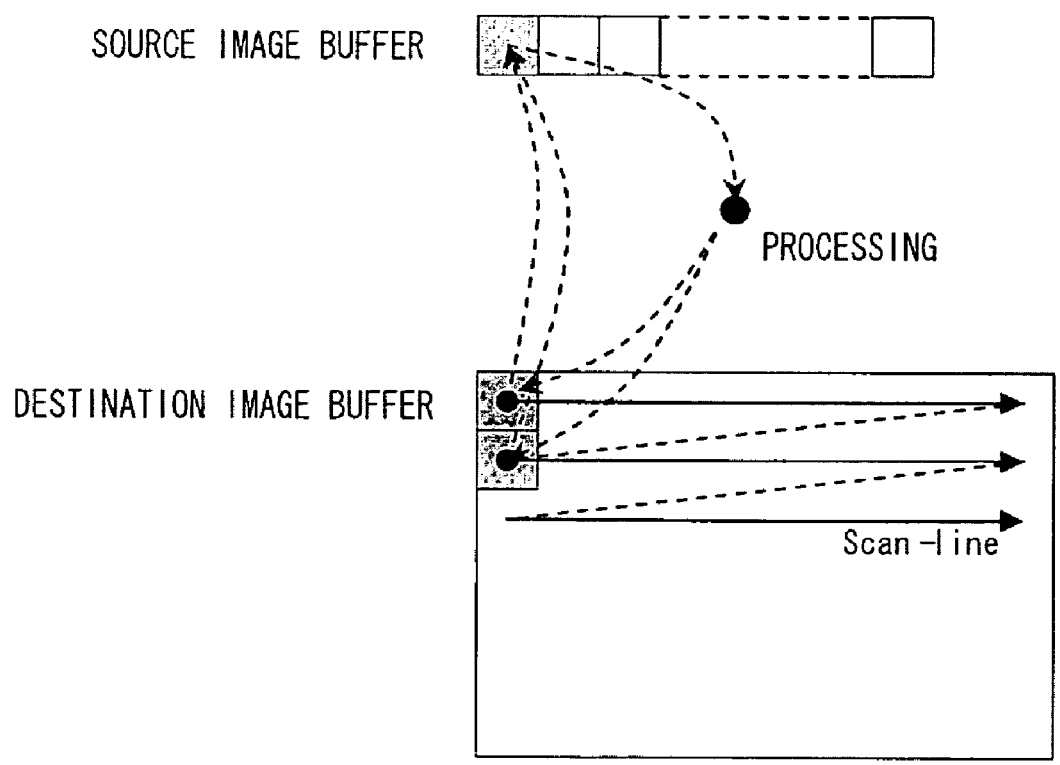
FIG. 9 is a conceptual diagram showing image drawing processing of a conventional image processing apparatus.
Figures 11A, 11B:
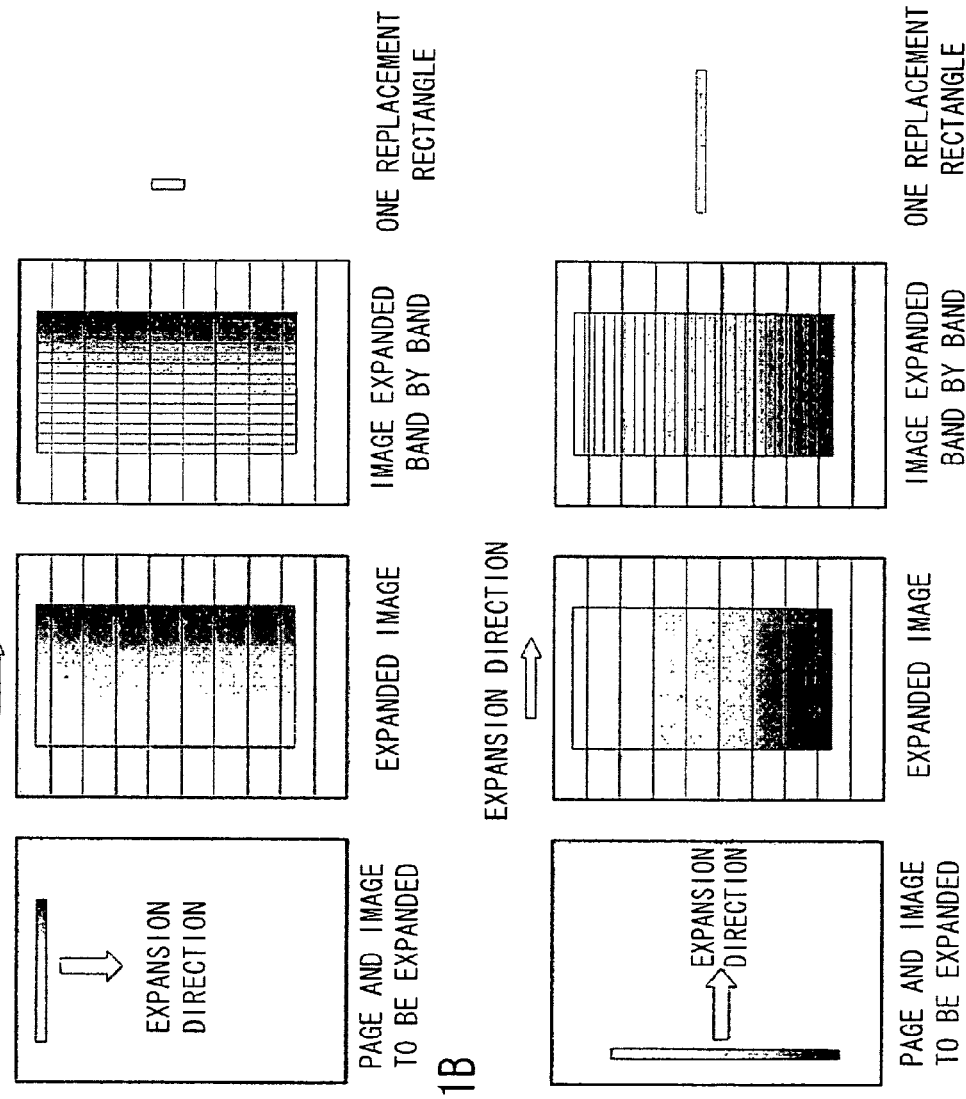
FIGS. 11A and 11B schematically show manners of replacement of an expanded image with rectangles.

In the drawing unit 34, when the image expansion direction is perpendicular to the band extending direction and the expanded image of the 1-line source image is not the small color variation image, conventional image processing is performed. For example, a destination image DI1 which is H pixels in height and W pixels in width (see FIG. 7B) is generated as an expanded version of a subject drawing object source image SI1 which is 1 (H') pixel in height and W' pixels in width (see FIG. 7A). Only when the expanded image of the 1-line source image is the small color variation image, for example, instead of generating a destination image DI1 which is H pixels in height and W pixels in width (see FIG. 5B) as an expanded version of a subject drawing object source image SI1 which is 1 (H') pixel in height and W' pixels in width (see FIG. 5A), a bit map of a destination image DI1' obtained by processing the source image SI1 through replacement with vectors which are a series of relatively large, wide rectangular regions SA1, SA2, . . . , SAn of same-color pixels which are long in the vertical direction is generated (see FIG. 5C).

Figure 6A:
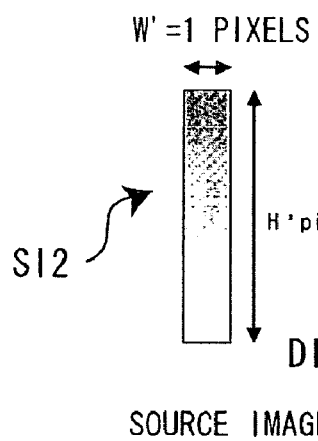
FIGS. 6A-6C schematically show an example in which an expanded image of a source image having a width of one pixel is drawn by the image processing apparatus shown in FIG. 1.
Figure 6B:
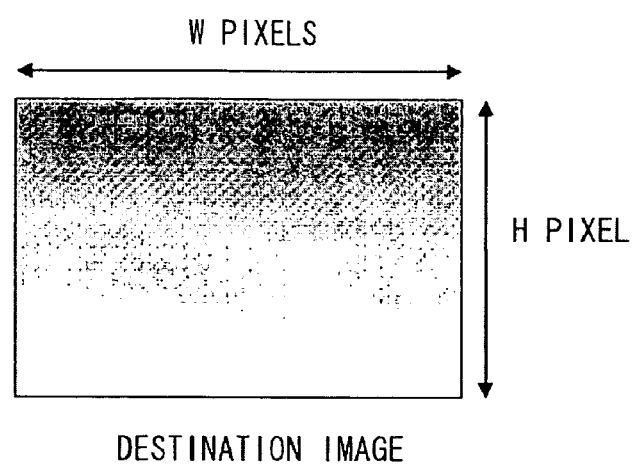
Figure 6C:
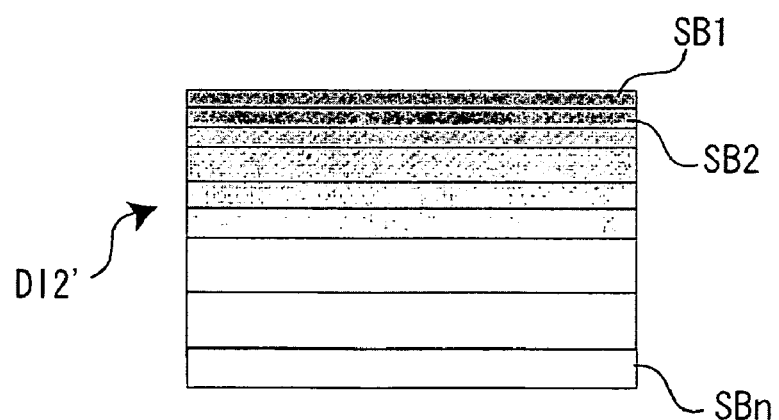

In the drawing unit 34, when the image expansion direction is parallel with the band extending direction, for example, instead of generating a destination image DI2 which is H pixels in height and W pixels in width (see FIG. 6B) as an expanded version of a subject drawing object source image SI2 which is H' pixel in height and 1 (W') pixel in width (see FIG. 6A), a bit map of a destination image DI2' obtained by processing the source image SI2 through replacement with vectors which are a series of rectangular regions SB1, SB2, . . . , SBn of same-color pixels which are long in the horizontal direction is generated (see FIG. 6C).

As described above, in the case where the expansion direction of an expanded image of a 1-line source image is parallel with a band expansion direction or in the case where the expanded image of a 1-line source image is the small color variation image though the expansion direction of the expanded image of the 1-line source image is perpendicular to a band expansion direction, the drawing processing on the expanded image of the 1-line source image can be performed at high speed by analyzing the 1-line source image and converting it into vectors.

Although in the above description steps S5-S7 are separate steps, a modification is possible in which the region concerned is converted into a vector as soon as what number of same-color pixels are arranged continuously is recognized while a 1-line source image is analyzed.

Step S3 may be omitted. That is, a transition is made directly to step S4 when the judgment result at step S2 is "yes."

The invention, which has been described above in the form of an embodiment, is summarized as follows. According to one exemplary embodiment of the invention, an image processing apparatus comprising: a communication unit configured to communicate with an external apparatus; an expanded image judging unit configured to judge whether an image to be drawn in response to a request that is received from the external apparatus by the communication unit is an expanded image of a 1-line source image; an image expansion direction judging unit configured to judge whether an expansion direction of the expanded image of the 1-line source image is parallel with a band extending direction when the expanded image judging unit judges that the image to be drawn is the expanded image of the 1-line source image; a drawing data processing unit configured to analyze the 1-line source image and converts the expanded image of the 1-line source image into vectors that are a series of rectangular regions of same-color pixels that are arranged continuously when the image expansion direction judging unit judges that the expansion direction of the expanded image of the 1-line source image is parallel with the band extending direction; and a drawing processing unit configured to generate a bit map of a destination image to be drawn on a basis of the expanded image as converted into the vectors by the drawing data processing unit, wherein intermediate codes are: generated by dividing a drawing image into prescribed bands extending in one direction, developed into a bit image, and drawn as the bit image.

For example, the image processing apparatus according to the embodiment of the invention further comprises a color variation judging unit configured to judge whether the expanded image of the 1-line source image is a small color variation image on a basis of a comparison result between an analyzed value of the 1-line source image and a threshold value when the image expansion direction judging unit judges that the expansion direction of the expanded image of the 1-line source image is not parallel with the band extending direction, wherein the drawing data processing unit is configured to analyze the 1-line source image and to convert the expanded image of the 1-line source image into vectors that are a series of rectangular regions of same-color pixels that are arranged continuously when the image expansion direction judging unit judges that the expansion direction of the expanded image of the 1-line source image is parallel with the band extending direction, or when the color variation judging unit judges that the expanded image of the 1-line source image is a small color variation image.

Another exemplary embodiment of the invention, an image processing apparatus comprising: a communication unit configured to communicate with an external apparatus; an expanded image judging unit configured to judge whether an image to be drawn in response to a request that is received from the external apparatus by the communication unit is an expanded image of a 1-line source image; an image expansion direction judging unit configured to judge whether an expansion direction of the expanded image of the 1-line source image is parallel with a band extending direction when the expanded image judging unit judges that the image to be drawn is the expanded image of the 1-line source image; a color variation judging unit configured to judge whether the expanded image of the 1-line source image is a small color variation image on a basis of a comparison result between an analyzed value of the 1-line source image and a threshold value when the image expansion direction judging unit judges that the expansion direction of the expanded image is not parallel with the band extending direction; a drawing data processing unit configured to analyze the 1-line source image and convert the expanded image of the 1-line source image into vectors that are a series of rectangular regions of same-color pixels that are arranged continuously when the color variation judging unit judges that the expanded image of the 1-line source image is the small color variation image; and a drawing processing unit configured to generate a bit map of a destination image to be drawn on a basis of the expanded image as converted into the vectors by the drawing data processing unit, wherein intermediate codes are: generated by dividing a drawing image into prescribed bands extending in one direction, developed into a bit image, and drawn as the bit image.

For example, in the image processing apparatus according to the invention, the color variation judging unit judges whether the expanded image of the 1-line source image is the small color variation image by being: configured to determine the analyzed value derived from the numbers of same-color pixels that are arranged continuously in the 1-line source image, and configured to compare the analyzed value with the threshold value.

For example, in the image processing apparatus according to the invention, the drawing data processing unit is: configured to analyze the 1-line source image to determine the numbers of same-color pixels that are arranged continuously; configured to sequentially calculate rectangular regions of same-color pixels of the expanded image on the basis of an analysis result and an expansion ratio; and configured to convert each of the calculated rectangular regions into a vector.

For example, in the image processing apparatus according to the invention, the drawing data processing unit is: configured to analyze the 1-line source image to determine the number of same-color pixels that are arranged continuously; and configured to convert the calculated rectangular region into a vector every time a rectangular region of same-color pixels of the expanded image is calculated on a basis of an analysis result and an expansion ratio.

Another exemplary embodiment of the invention is a processor-readable storage medium on which an image processing program is stored, the image processing program being executed by a computer provided in an image processing apparatus which generates intermediate codes by dividing a drawing image into prescribed bands extending in one direction in response to a request that is received from an external apparatus by a communication unit which communicates with the external apparatus, develops the intermediate codes into a bit image, and draws the bit image, the image processing program causing the computer to execute: the expanded image judging step of judging whether an image to be drawn in response to a request is an expanded image of a 1-line source image; an image expansion direction judging step of judging whether an expansion direction of the expanded image of the 1-line source image is parallel with the band extending direction when the expanded image judging step judges that the image to be drawn is the expanded image of the 1-line source image; a drawing data processing step of analyzing the 1-line source image and converting the expanded image of the 1-line source image into vectors which are a series of rectangular regions of same-color pixels that are arranged continuously when the image expansion direction judging step judges that the expansion direction of the expanded image of the 1-line source image is parallel with the band extending direction; and a drawing processing step of generating a bit map of a destination image to be drawn on the basis of the expanded image as converted into the vectors by the drawing data processing step.

For example, according to the embodiment of the invention, the image processing program causes the computer to further execute a color variation judging step of judging whether the expanded image of the 1-line source image is a small color variation image on the basis of comparison result between an analyzed value of the 1-line source image and a threshold value when the image expansion direction judging step judges that the expansion direction of the expanded image of the 1-line source image is not parallel with the band extending direction, and the drawing data processing step analyzes the 1-line source image and converts the expanded image of the 1-line source image into vectors which are a series of rectangular regions of same-color pixels that are arranged continuously when the image expansion direction judging unit judges that the expansion direction of the expanded image of the 1-line source image is parallel with the band extending direction or when the color variation judging unit judges that the expanded image of the 1-line source image is the small color variation image.

Another exemplary embodiment of the invention is a processor-readable storage medium on which an image processing program is stored, the image processing program being executed by a computer provided in an image processing apparatus which generates intermediate codes by dividing a drawing image into prescribed bands extending in one direction, develops the intermediate codes into a bit image, and draws the bit image, the image processing program causing the computer to execute: a communication step of communicating with an external apparatus; an expanded image judging step of judging whether an image to be drawn in response to a request that is received from the external apparatus by the communication step is an expanded image of a 1-line source image; an image expansion direction judging step of judging whether an expansion direction of the expanded image of the 1-line source image is parallel with the band extending direction when the expanded image of the 1-line source image judging step judges that the image to be drawn is the expanded image of the 1-line source image; a color variation judging step of judging whether the expanded image of the 1-line source image is a small color variation image on the basis of comparison result between an analyzed value of the 1-line source image and a threshold value when the image expansion direction judging step judges that the expansion direction of the expanded image of the 1-line source image is not parallel with the band extending direction; a drawing data processing step of analyzing the 1-line source image and converting the expanded image of the 1-line source image into vectors which are a series of rectangular regions of same-color pixels that are arranged continuously when the color variation judging step judges that the expanded image of the 1-line source image is the small color variation image; and a drawing processing step of generating a bit map of a destination image to be drawn on the basis of the expanded image as converted into the vectors by the drawing data processing step.

For example, in the processor-readable storage medium according to the invention, the color variation judging step judges whether the expanded image of the 1-line source image is the small color variation image by determining the analyzed value derived from the numbers of same-color pixels that are arranged continuously in the 1-line source image and comparing the analyzed value with the threshold value.

For example, in the processor-readable storage medium according to the embodiment of the invention, the drawing data processing step analyzes the 1-line source image to determine the numbers of same-color pixels that are arranged continuously, sequentially calculates rectangular regions of same-color pixels of the expanded image on the basis of an analysis result and an expansion ratio, and converts each of the calculated rectangular regions into a vector.

For example, in the processor-readable storage medium according to the embodiment of invention, the drawing data processing step analyzes the 1-line source image to determine the number of same-color pixels that are arranged continuously, and converts the calculated rectangular region into a vector every time a rectangular region of same-color pixels of the expanded image is calculated on the basis of an analysis result and an expansion ratio.

Yet another exemplary embodiment of the invention is a method for image processing, comprising: receiving image drawing instruction; determining whether the image is an expanded image of a 1-line source image; when the image is an expanded image of a 1-line source image: determining whether the expansion direction is parallel with a band extending direction; determining whether the expanded image of the 1-line source image is a small color variation image on a basis of a comparison result between an analyzed value of the 1-line source image and a threshold value when the expansion direction is not parallel; analyzing the expanded image of a 1-line source image when the expansion direction; calculating rectangular regions of the expanded image; performing vector processing on each rectangular region; and when the image is not an expanded image of a 1-line source image, performing general-purpose image processing when the expanded image when the image is not an expanded image of a 1-line source image.

In yet another exemplary embodiment of the invention, a processor-readable storage medium containing a software program operable to cause a plurality of apparatus including a processor operating under the instructions of the software program to perform a method for image processing, comprising: receiving image drawing instruction; determining whether the image is an expanded image of a 1-line source image; when the image is an expanded image of a 1-line source image: determining whether the expansion direction is parallel with a band extending direction; determining whether the expanded image of the 1-line source image is a small color variation image on a basis of a comparison result between an analyzed value of the 1-line source image and a threshold value when the expansion direction is not parallel; analyzing the expanded image of a 1-line source image when the expansion direction; calculating rectangular regions of the expanded image; performing vector processing on each rectangular region; and when the image is not an expanded image of a 1-line source image, performing general-purpose image processing when the expanded image when the image is not a 1-line expansion image.

Having the above configuration, the image processing apparatus according to the invention can perform gradation drawing processing based on a 1-line image at high speed.

For example, all or part of the memory management programs are provided by an arbitrary computer-readable recording medium such as a magneto-optical disc, an optical disc, or a semiconductor memory. Programs read from the recording medium are installed in a computer and executed therein.

What is claimed is:

1. An image processing apparatus comprising:
    a communication unit configured to communicate with an external apparatus;
    an expanded image judging unit configured to judge whether an image to be drawn in response to a request that is received from the external apparatus by the communication unit is an expanded image of a 1-line source image;
    an image expansion direction judging unit configured to judge whether an expansion direction of the expanded image of the 1-line source image is parallel with a band extending direction when the expanded image judging unit judges that the image to be drawn is the expanded image of the 1-line source image;
    a drawing data processing unit configured to analyze the 1-line source image and converts the expanded image of the 1-line source image into vectors that are a series of rectangular regions of same-color pixels that are arranged continuously when the image expansion direction judging unit judges that the expansion direction of the expanded image of the 1-line source image is parallel with the band extending direction; and
    a drawing processing unit configured to generate a bit map of a destination image to be drawn on a basis of the expanded image as converted into the vectors by the drawing data processing unit,
    wherein intermediate codes are: generated by dividing a drawing image into prescribed bands extending in one direction, developed into a bit image, and drawn as the bit image.

2. The image processing apparatus according to claim 1, further comprising:
    a color variation judging unit configured to judge whether the expanded image of the 1-line source image is a small color variation image on a basis of a comparison result between an analyzed value of the 1-line source image and a threshold value when the image expansion direction judging unit judges that the expansion direction of the expanded image of the I-line source image is not parallel with the band extending direction,
    wherein the drawing data processing unit is configured to analyze the 1-line source image and to convert the expanded image of the 1-line source image into vectors that are a series of rectangular regions of same-color pixels that are arranged continuously when the image expansion direction judging unit judges that the expansion direction of the expanded image of the 1-line source image is parallel with the band extending direction, or when the color variation judging unit judges that the expanded image of the 1-line source image is a small color variation image.

3. The image processing apparatus according to claim 2, wherein the color variation judging unit judges whether the expanded image of the 1-line source image is the small color variation image by being:
    configured to determine the analyzed value derived from the numbers of same-color pixels that are arranged continuously in the 1-line source image; and
    configured to compare the analyzed value with the threshold value.

4. The image processing apparatus according to claim 1, wherein the drawing data processing unit is:
    configured to analyze the 1-line source image to determine the numbers of same-color pixels that are arranged continuously;
    configured to sequentially calculate rectangular regions of same-color pixels of the expanded image on the basis of an analysis result and an expansion ratio; and
    configured to convert each of the calculated rectangular regions into a vector.

5. The image processing apparatus according to claim 1, wherein the drawing data processing unit is:
    configured to analyze the 1-line source image to determine the number of same-color pixels that are arranged continuously; and
    configured to convert the calculated rectangular region into a vector every time a rectangular region of same-color pixels of the expanded image is calculated on a basis of an analysis result and an expansion ratio.

6. An image processing apparatus comprising:
a communication unit configured to communicate with an external apparatus;
an expanded image judging unit configured to judge whether an image to be drawn in response to a request that is received from the external apparatus by the communication unit is an expanded image of a 1-line source image;
an image expansion direction judging unit configured to judge whether an expansion direction of the expanded image of the 1-line source image is parallel with a band extending direction when the expanded image judging unit judges that the image to be drawn is the expanded image of the 1-line source image;
a color variation judging unit configured to judge whether the expanded image of the 1-line source image is a small color variation image on a basis of a comparison result between an analyzed value of the 1-line source image and a threshold value when the image expansion direction judging unit judges that the expansion direction of the expanded image is not parallel with the band extending direction;
a drawing data processing unit configured to analyze the 1-line source image and convert the expanded image of the 1-line source image into vectors that are a series of rectangular regions of same-color pixels that are arranged continuously when the color variation judging unit judges that the expanded image of the 1-line source image is the small color variation image; and
a drawing processing unit configured to generate a bit map of a destination image to be drawn on a basis of the expanded image as converted into the vectors by the drawing data processing unit,
wherein intermediate codes are: generated by dividing a drawing image into prescribed bands extending in one direction, developed into a bit image, and drawn as the bit image.

7. The image processing apparatus according to claim 6, wherein the color variation judging unit judges whether the expanded image of the 1-line source image is the small color variation image by being:
configured to determine the analyzed value derived from the numbers of same-color pixels that are arranged continuously in the 1-line source image; and
configured to compare the analyzed value with the threshold value.

8. The image processing apparatus according to claim 6, wherein the drawing data processing unit is:
configured to analyze the 1-line source image to determine the numbers of same-color pixels that are arranged continuously;
configured to sequentially calculate rectangular regions of same-color pixels of the expanded image on the basis of an analysis result and an expansion ratio; and
configured to convert each of the calculated rectangular regions into a vector.

9. The image processing apparatus according to claim 6, wherein the drawing data processing unit is:
configured to analyze the 1-line source image to determine the number of same-color pixels that are arranged continuously; and
configured to convert the calculated rectangular region into a vector every time a rectangular region of same-color pixels of the expanded image is calculated on a basis of an analysis result and an expansion ratio.

10. A non-transitory processor-readable storage medium on which an image processing program is stored, the image processing program being executed by a computer provided in an image processing apparatus which generates intermediate codes by dividing a drawing image into prescribed bands extending in one direction in response to a request that is received from an external apparatus by a communication unit which communicates with the external apparatus, develops the intermediate codes into a bit image, and draws the bit image, the image processing program causing the computer to execute:
the expanded image judging step of judging whether an image to be drawn in response to a request is an expanded image of a 1-line source image;
an image expansion direction judging step of judging whether an expansion direction of the expanded image of the 1-line source image is parallel with the band extending direction when the expanded image judging step judges that the image to be drawn is the expanded image of the 1-line source image;
a drawing data processing step of analyzing the 1-line source image and converting the expanded image of the 1-line source image into vectors which are a series of rectangular regions of same-color pixels that are arranged continuously when the image expansion direction judging step judges that the expansion direction of the expanded image of the 1-line source image is parallel with the band extending direction; and
a drawing processing step of generating a bit map of a destination image to be drawn on the basis of the expanded image as converted into the vectors by the drawing data processing step.

11. A non-transitory processor-readable storage medium on which an image processing program is stored, the image processing program being executed by a computer provided in an image processing apparatus which generates intermediate codes by dividing a drawing image into prescribed bands extending in one direction, develops the intermediate codes into a bit image, and draws the bit image, the image processing program causing the computer to execute:
a communication step of communicating with an external apparatus;
an expanded image judging step of judging whether an image to be drawn in response to a request that is received from the external apparatus by the communication step is an expanded image of a 1-line source image;
an image expansion direction judging step of judging whether an expansion direction of the expanded image of the 1-line source image is parallel with the band extending direction when the expanded image judging step judges that the image to be drawn is the expanded image of the 1-line source image;
a color variation judging step of judging whether the expanded image of the 1-line source image is a small color variation image on the basis of comparison result between an analyzed value of the 1-line source image and a threshold value when the image expansion direction judging step judges that the expansion direction of the expanded image of the 1-line source image is not parallel with the band extending direction;
a drawing data processing step of analyzing the 1-line source image and converting the expanded image of the 1-line source image into vectors which are a series of rectangular regions of same-color pixels that are arranged continuously when the color variation judging step judges that the expanded image of the 1-line source image is the small color variation image; and a drawing processing step of generating a bit map of a destination image to be drawn on the basis of the expanded image as converted into the vectors by the drawing data processing step.

12. A method for image processing, comprising:

receiving image drawing instruction;

determining whether the image is an expanded image of a 1-line source image;

when the image is an expanded image of a 1-line source image:

determining whether the expansion direction is parallel with a band extending direction;

determining whether the expanded image of the 1-line source image is a small color variation image on a basis of a comparison result between an analyzed value of the 1-line source image and a threshold value when the expansion direction is not parallel;

analyzing the expanded image of a 1-line source image when the expansion direction;

calculating rectangular regions of the expanded image;

performing vector processing on each rectangular region;

and when the image is not an expanded image of a 1-line source image, performing general-purpose image processing when the expanded image when the image is not an expanded image of a 1-line source image.

13. A non-transitory processor-readable storage medium containing a software program operable to cause a plurality of apparatus including a processor operating under the instructions of the software program to perform a method for image processing, comprising:

receiving image drawing instruction;

determining whether the image is an expanded image of a 1-line source image;

when the image is an expanded image of a 1-line source image:

determining whether the expansion direction is parallel with a band extending direction;

determining whether the expanded image of the 1-line source image is a small color variation image on a basis of a comparison result between an analyzed value of the 1-line source image and a threshold value when the expansion direction is not parallel;

analyzing the expanded image of a 1-line source image when the expansion direction;

calculating rectangular regions of the expanded image;

performing vector processing on each rectangular region;

and when the image is not an expanded image of a 1-line source image, performing general-purpose image processing when the expanded image when the image is not a 1-line expansion image.

\* \* \* \* \*